United States Patent [19]

Kurakake et al.

[11] Patent Number: 4,573,002
[45] Date of Patent: Feb. 25, 1986

[54] SERVOMOTOR CONTROL SYSTEM

[75] Inventors: Mitsuo Kurakake, Hino; Keiji Sakamoto, Hachioji, both of Japan

[73] Assignee: Fanuc Ltd, Minamitsuru, Japan

[21] Appl. No.: 637,220

[22] Filed: Jul. 23, 1984

[30] Foreign Application Priority Data

Nov. 25, 1982 [JP] Japan .................... 57-206423

[51] Int. Cl.$^4$ .................................. H02P 5/28
[52] U.S. Cl. .................... 318/721; 318/722; 318/345 B; 318/345 AB
[58] Field of Search ............... 318/615, 616, 617, 611, 318/618, 561, 632, 714, 715, 721–723, 724, 397, 398, 393–396, 432, 339, 345 R, 345 A, 345 C, 345 E, 345 CA, 345 CB, 345 AB

[56] References Cited

U.S. PATENT DOCUMENTS

| | | | |
|---|---|---|---|
| 3,916,279 | 10/1975 | Kawano | 318/632 X |
| 4,240,020 | 12/1980 | Okuyama | 318/721 |
| 4,276,505 | 6/1981 | Bose | 318/723 |
| 4,358,722 | 11/1982 | Iwakane | 318/616 X |

Primary Examiner—William M. Shoop, Jr.
Assistant Examiner—Patrick C. Keane
Attorney, Agent, or Firm—Staas & Halsey

[57] ABSTRACT

A servomotor control system includes a sensor for sensing the velocity of a servomotor (101), a sensor for sensing an actual current flowing into the servomotor (101), a power drive circuit for driving the servomotor (101), and control units (MP1, MP2). The control unit MP1 performs a velocity loop computation to derive a current command for the servomotor based on an offset velocity between a velocity command for the servomotor and the sensed actual velocity. The control unit MP2 performs a current loop computation to obtain a command for the power drive circuit. In the current loop computation of the control unit MP2 a velocity compensation signal is obtained by amplifying the sensed actual velocity by a predetermined magnification, so that the command for the power drive circuit is compensated by the velocity compensation signal. The velocity loop computation is executed at a period longer than that at which the current loop computation is executed.

6 Claims, 10 Drawing Figures

SERVOMOTOR CONTROL SYSTEM

BACKGROUND OF THE INVENTION

This invention relates to a servomotor control system in which a velocity loop computation and a current loop computation for controlling a servomotor are performed by a microprocessor. More particularly, the invention relates to a servomotor control system for accommodating the load on the processor with the response of the computations in each of the loops.

An arithmetic circuit such as a microprocessor has recently come to be employed for controlling a servomotor. It is required that the microprocessor execute at least a velocity loop computation, in which a current command is computed from an offset velocity (which is the difference) between a commanded velocity and the actual velocity of the servomotor), and a current loop computation, in which a command for application to the current drive circuit of the servomotor is computed based on a difference between a current command and the armature current of the servomotor.

In order to obtain a desirable servomotor operating characteristic, it is required that the response characteristic of the current loop be quicker than that of the velocity loop. Since there is interference between current and velocity ascribable to a reverse electromotive force in a servomotor, the velocity loop and current loop computations cannot be rendered independent of each other and both computations must be executed at a predetermined sampling period. The result is a burden upon the microprocessor in terms of processing time.

SUMMARY OF THE INVENTION

An object of the present invention is to provide a servomotor control system which eliminates the aforementioned interference between velocity and current, and which sets the period at which the velocity loop computation is performed to one which is longer than that at which the current loop computation is performed, so that the burden on the microprocessor can be lightened.

A servomotor is controlled by providing a sensor for sensing the velocity of the servomotor, a sensor for sensing an actual current flowing into the servomotor, a power drive circuit for driving the servomotor, and a control unit for performing a velocity loop computation to derive a current command for the servomotor based on an offset velocity (which is the difference) between a velocity command and the sensed actual velocity), and for performing a current loop computation to obtain a command for the power drive circuit. In the current loop computation, a velocity compensation signal is obtained by amplifying the sensed actual velocity by a predetermined magnification, the command for the power drive circuit is compensated by the velocity compensation signal, and the velocity loop computation is executed at a period longer than that at which the current loop computation is executed. According to the present invention, the load on the control unit performing the computations can be reduced, and the current loop computation can be executed at a short sampling period.

BRIEF DESCRIPTION OF THE DRAWINGS

FIGS. 3a and 3b are graphs for describing velocity and current on the basis of the conventional control system;

DESCRIPTION OF THE PREFERRED EMBODIMENT

The present invention will now be described in detail in accordance with the drawings.

Figures 1, 3:
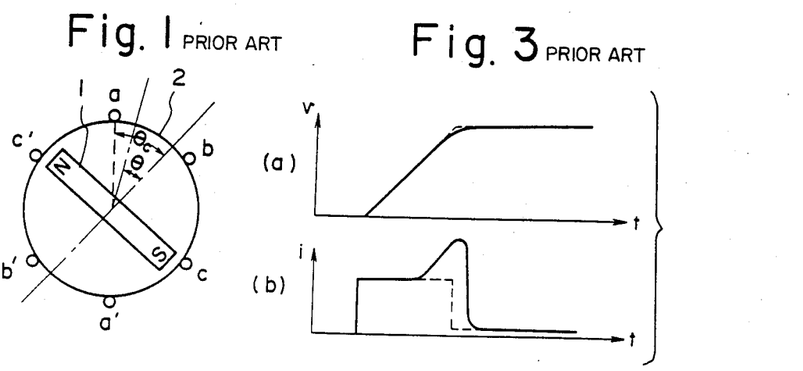
FIG. 1 is a diagram of the construction of a synchronous motor.

A synchronous motor may serve as a servomotor which requires a current loop having a quick response characteristic. In a synchronous motor of this kind, it is necessary that torque be controlled so as to be constant. To this end, there has been developed a technique in which control is exercised in such a manner that a current of the same phase as an electromotive force induced by the rotor is caused to flow into the windings of the armature, which serves as the stator. This technique will now be described using the drawing of FIG. 1, which shows the construction of a synchronous motor. The magnetic flux density B at a position displaced by $\theta$ degrees from the q axis of the magnetic field generated by a rotor 1, namely a permanent magnet, is given by the following:

$$B = B_m \sin \theta \quad (1)$$

The magnetic flux $\phi$ interlinked with the a winding of a stator 2 shown in FIG. 1 is expressed as follows:

$$\phi = -\phi_m \cos \theta_c \quad (2)$$

where $\phi_m$ represents the magnetic flux on the q axis of the rotor 1.

Accordingly, the electromotive force $e_1$ induced in the a winding is expressed as follows:

$$\begin{aligned} e_1 &= -d\phi/dt \\ &= -\phi_m \cdot p \cdot \omega_m \sin\theta \end{aligned} \quad (3)$$
(where $\theta = P\theta m = P \cdot \omega_m \cdot t$).

Likewise, the electromotive forces $e_2$, $e_3$ induced in the b and c windings of the stator 2, which are disposed at angles of $\frac{2}{3}\pi$ and $\frac{4}{3}\pi$ relative to the a winding, respectively, are expressed by the following:

$$e_2 = -\phi_m \cdot P \cdot \omega_m \cdot \sin(\theta - \frac{2}{3}\pi) \quad (4)$$

$$e_3 = -\phi_m \cdot P \cdot \omega_m \cdot \sin(\theta - 4/3\pi) \quad (5)$$

If we let the currents flowing in the armature windings a, b, c be $i_1$, $i_2$, $i_3$, respectively, then the output torque T of such a three-phase synchronous motor will be expressed by the following:

$$T = \frac{1}{2}(e_1 \cdot i_1 + e_2 \cdot i_2 + e_3 \cdot i_3) \quad (6)$$

Therefore, substituting Eqs. (3), (4) and (5) into Eq. (6), we have:

$$T = -\frac{1}{2} \phi_m \cdot p \cdot \omega_m \left\{ i_1 \cdot \sin\theta + i_2 \cdot \sin\left(\theta - \frac{2}{3}\pi\right) + i_3 \cdot \sin\left(\theta - \frac{4}{3}\pi\right) \right\} \quad (7)$$

To render the torque T constant, it should be so arranged that T is independent of the angle $\theta$. Therefore, if the following relations hold, namely:

$$\left. \begin{array}{l} i_1 = I\sin\theta \\ i_2 = I\sin\left(\theta - \frac{2}{3}\pi\right) \\ i_3 = I\sin\left(\theta - \frac{4}{3}\pi\right) \end{array} \right\} \quad (8)$$

where I is the current amplitude, then the torque T of Eq. (7) may be written as follows:

$$T = \frac{1}{2}K\left\{ I\sin^2\theta + I\sin^2\left(\theta - \frac{2}{3}\pi\right) + I\sin^2\left(\theta - \frac{4}{3}\pi\right) \right\}$$

Thus, the torque T is constant, being independent of the rotational orientation of the rotor 1.

To carry out such control, it is necessary to detect the rotor angle of the synchronous motor and regulate each of the armature current values in accordance therewith.

However, if the current flowing through each armature winding is delayed by $\theta_o$ from the ideal value, then the currents $i_1$, $i_2$, $i_3$ of the respective armature windings will take on the form:

$$i_1 = I\sin(\theta - \phi_o)$$

$$i_2 = I\sin\left(\theta - \frac{2}{3}\pi - \phi_o\right)$$

$$i_3 = I\sin\left(\theta - \frac{4}{3}\pi - \phi_o\right)$$

In consequence, the output torque T will take on the form:

$$T = 3/2KI \sin(\pi/2 + \phi_o)$$

Thus, the torque will decrease in value.

Figure 2:
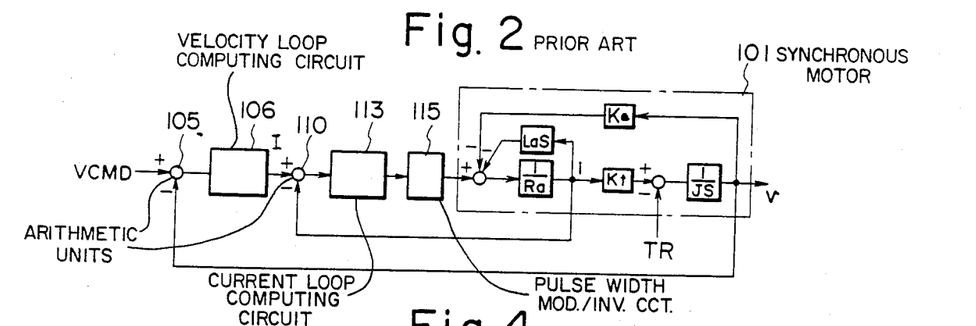
FIG. 2 is a block diagram of conventional servo control.

In order to effect control to render the torque of a synchronous motor constant, it is necessary to improve the actual current response with respect to the current command. Specifically, as shown in the block diagram of FIG. 2 illustrating a conventional control circuit for a synchronous motor, the actual rotational velocity v of a synchronous motor 101 is detected, the difference between v and a commanded velocity VCMD is found by an arithmetic unit 105, the velocity difference obtained is converted into a current command I by a velocity loop computing circuit 106, thereafter the difference between the current command I and the actual current i flowing into the synchronous motor 1 is computed by an arithmetic unit 110, the current difference is operated upon by a current loop computing circuit 113, and the output of the computing circuit 113 is power amplified by a pulse width modulator/inverter circuit 115, the output of the circuit 115 being applied to the synchronous motor 101.

To execute the foregoing by a microprocessor, the operations performed by the velocity loop arithmetic units 105, 106 and current loop arithmetic units 110, 113 should be executed by computer processing. The processing is required to be carried out at a sampling period dependent upon the response characteristic of the current loop. However, since there is interference between current and velocity ascribable to a reverse electromotive force in the servomotor, the velocity loop and current loop computations cannot be rendered independent of each other and both computations must be executed at a predetermined sampling period. The result is a burden upon the microprocessor in terms of processing time.

Therefore, according to the invention, it is arranged so that the current loop can be operated independently of the velocity loop, and so that the period of the current loop computation is made shorter than that of the velocity loop computation. Reversely stated, the period of the velocity loop computation is lengthened, the microprocessor load is lightened, and the period of the current loop computation is shortened.

The following method is used to render the current loop and velocity loop independent of each other.

Specifically, if the synchronous motor 101 is expressed in terms of a transfer function, as shown in FIG. 2, the current loop includes feedback from the velocity v, which is attributed to the back electromotive force constant Ke of the motor. TR represents load torque, and La, Ra, Kt, J denote transfer constants. This velocity feedback has an effect upon the actual current. At high velocity, the current loop is influenced by the velocity v, resulting in diminished actual current response.

More specifically, let us consider acceleration. As shown in FIG. 3, in a situation where the velocity feedback is negligible, velocity v and actual current i make ideal transitions with respect to time t, as indicated by the dashed lines. As a result of velocity feedback, however, the actual current i is influenced by the velocity v, as shown by the solid line. This results in an enlarged current magnitude and prolonged acceleration time.

In FIG. 2, a differential equation involving actual velocity v and actual current i, in which load torque is negligible, may be written as follows:

$$\frac{d}{dt}\begin{pmatrix} v \\ i \end{pmatrix} = \begin{pmatrix} 0 & \frac{Kt}{J} \\ -\frac{Ke}{La} & -\frac{Ra}{La} \end{pmatrix} \times \begin{pmatrix} v \\ i \end{pmatrix} + \begin{pmatrix} 0 \\ \frac{1}{La} \end{pmatrix} e \quad (10)$$

The foregoing will be explained below in terms of a discrete value system considering implementation by a microprocessor.

Rewriting Eq. (10) in a discrete value system at a sampling period T will give us the following:

$$v(k+1) = \phi_{11} \cdot v(k) + \phi_{12} \cdot i(k) + h_1 \cdot u(k) \quad (11)$$

$$i(k+1) = \phi_{21} \cdot v(k) + \phi_{22} \cdot i(k) + h_2 \cdot u(k) \quad (12)$$

where u(k) represents the output of the current loop computing circuit 113.

It will be appreciated from Eq. (12) that eliminating the velocity term v(k) will render the current i(k+1) independent of velocity. Therefore, according to the present invention, the arrangement is such that velocity feedback is applied to the current loop, and the inherent velocity feedback of the synchronous motor is cancelled.

Figure 4:
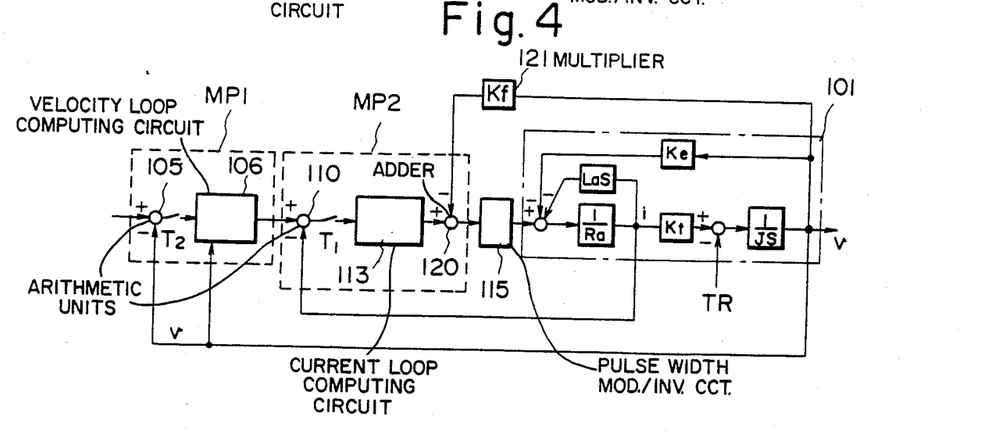
FIG. 4 is a block diagram of servo control according to the present invention.

FIG. 4 is a block diagram illustrating an embodiment of the present invention. Portions similar to those shown in FIG. 2 are designated by like reference characters. Numeral 120 denotes an adder, and 121 a multiplier, these elements constituting velocity feedback. If we assume that the multiplier 121 has a transfer constant kf and that this velocity feedback is applied to Eq. (12), then Eq. (12) may be written:

$$i(k + 1) = (\phi_{21} - kf \cdot h_2) v(k) + \phi_{22} \cdot i(k) + h_2 \cdot u(k) \quad (13)$$

Therefore, if a selection is made such that:

$$\phi_{21} - kf \cdot h_2 = 0 \quad (14)$$
$$\therefore kf = \phi_{21}/h_2$$

then Eq. (13) will reduce to:

$$i(k+1) = \phi_{22} i(k) + h_2 u(k) \quad (15)$$

so that the actual current i(k+1) will be independent of the velocity v. Thus, the characteristic of the current loop can be controlled independently of the velocity of the synchronous motor and, hence, there will be no deterioration in the response of the current loop even at high speeds.

Accordingly, the velocity loop computation is performed by a first microprocessor MP1, and the current loop computation is performed by a second microprocessor MP2. Thus, there will be no problem whatsoever even if computation periods T1, T2 associated with the respective microprocessors MP1, MP2 are changed. That is, the first microprocessor MP1 executes the velocity loop computation at a long period of T2 (e.g., 4T1), and the second microprocessor MP2 executed the current loop computation at a short period T1. Therefore, the first microprocessor MP1 is capable of performing other processing (status sensing, data exchange with external units, etc.).

Figure 5:
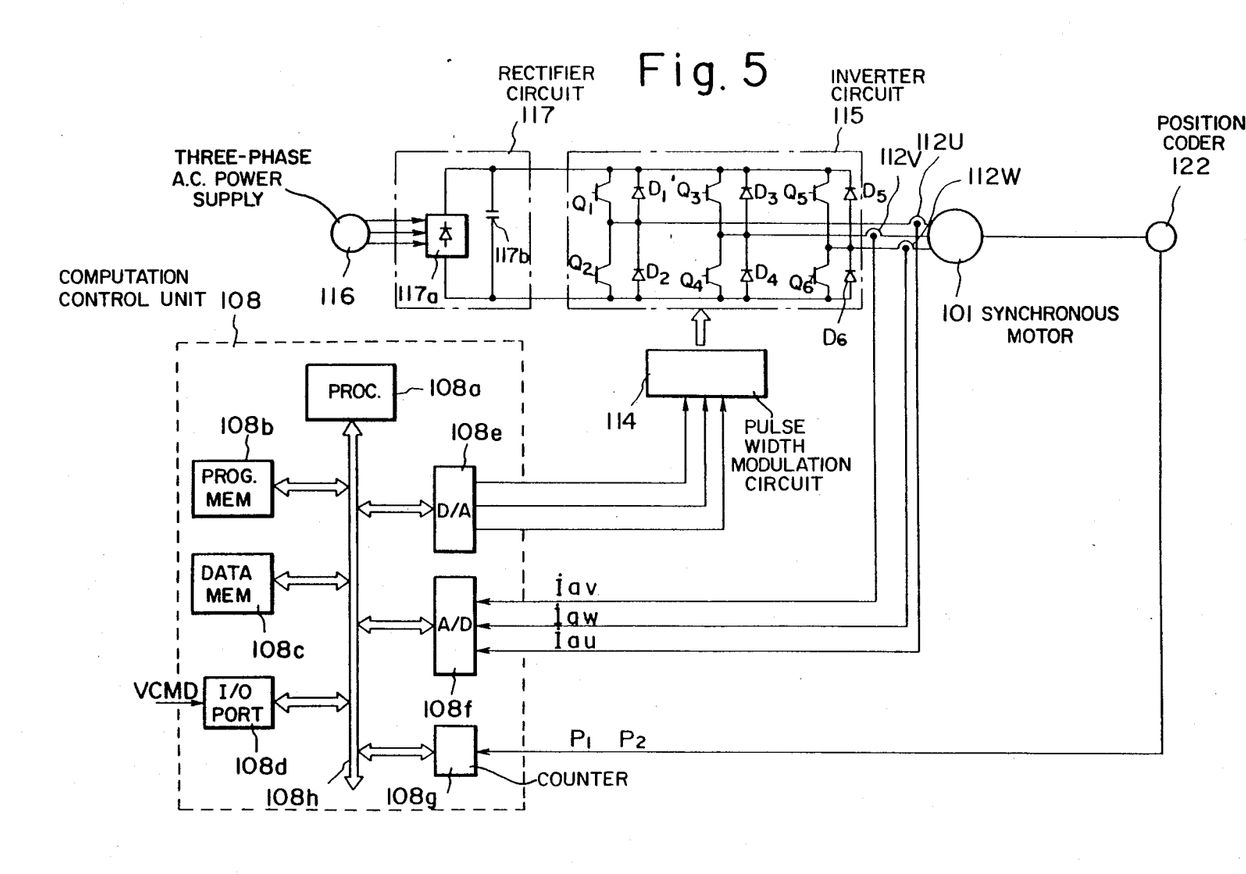
FIG. 5 is a circuit diagram of an embodiment of the present invention.

FIG. 5 is a circuit diagram of an embodiment of the present invention, in which the velocity loop and current loop computations are executed by a single microcomputer.

Figure 6:
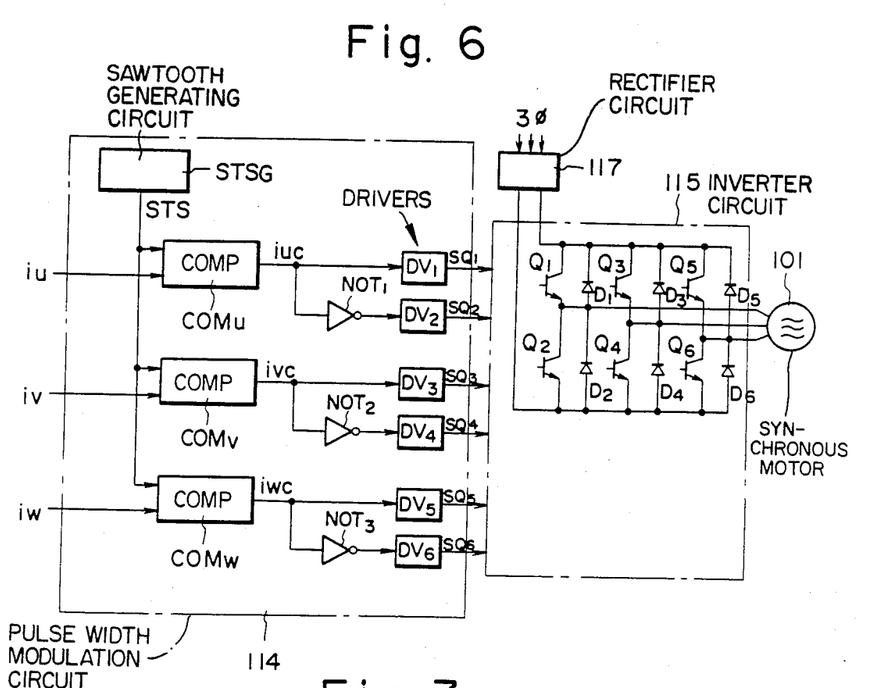
FIG. 6 is a circuit diagram of the construction of a principal portion of FIG. 5.
Figure 7:
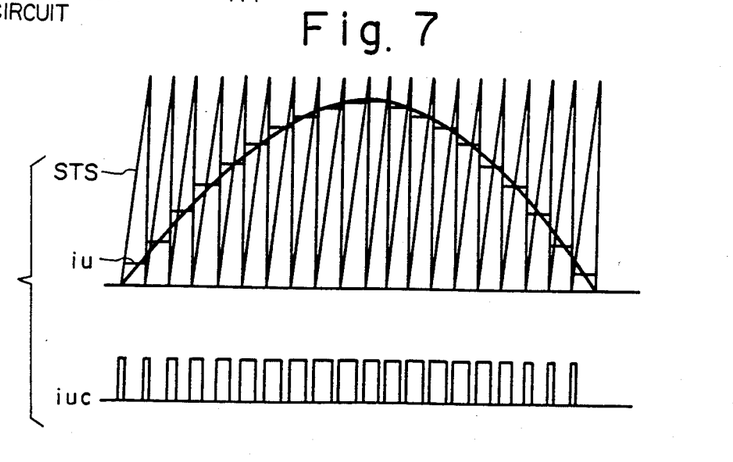
FIG. 7 is a graph for describing the operation of the arrangement shown in FIG. 6.

In the Figure, numeral 101 denotes a synchronous motor of revolving field type. Numeral 108 denotes a computation control unit which, by a computing operation based on a control program, performs the operations of the arithmetic circuit 105, velocity loop computing circuit 106, arithmetic circuit 110, current loop computing circuit 113 and adder 120 of FIG. 4. The computation control unit 108 is composed of a processor 108a for performing arithmetic operations in accordance with a motor control program; a program memory 108b storing the motor control program; a data memory 108c for storing data; an input/output port 108d for receiving commands from an external unit such as an NC unit; a digital-to-analog (DA) converter 108e for applying an analog current command to a pulse-width modulating circuit 114; an analog-to-digital (AD) converter 108f which receives phase currents $I_{au}$, $I_{av}$, $I_{aw}$ from current transformers 112U, 112V, 112W and converts these into digital values; a counter 108g in which a position code indicating the rotational position α of the field pole of the synchronous motor 101 is initially loaded from a position coder 2, the counter thereafter counting rotation pulses P1, P2 generated by the position (i.e., pulse) coder 112 whenever the synchronous motor 101 rotates through a predetermined angle; and an address/data bus 108h for interconnecting the foregoing components. The pulse coder 122 generates a position code indicating the position of the field pole of the synchronous motor 101, as well as rotation pulses produced whenever the motor 101 rotates through a predetermined angle. Numeral 114 denotes a pulse width modulation circuit, and 115 an inverter circuit controlled by the output signal of the pulse-width modulation circuit. Numeral 116 denotes a three-phase A.C. power supply, and 117 a well-known rectifier circuit comprising a group of diodes 117a and a capacitor 117b for converting the three-phase alternating current into direct current. As illustrated in FIG. 6, the pulse width modulation circuit 114 comprises a sawtooth generating circuit STSG for generating a sawtooth waveform STS, comparators $COM_U$, $COM_V$, $COM_W$, NOT gates $NOT_1$ through $NOT_3$, and drivers $DV_1$ through $DV_6$. The inverter circuit 115 includes six power transistors $Q_1$ through $Q_6$ and six diodes $D_1$ through $D_6$. The comparators $COM_U$, $COM_V$, $COM_W$ of the pulse width modulation circuit 114 compare the sawtooth signal STS with the amplitudes of the three-phase alternating circuit signals iu, iv, iw respectively, and produce a "1" output when iu, iv, or iw is greater than the value of STS, or a "0" output when iu, iv or iw is smaller. Thus, with respect to the current signal $i_u$, the comparator $COM_U$ produces the current command $i_{uc}$ shown in FIG. 7. More specifically, pulse-width modulated three-phase current commands $i_{uc}$, $i_{vc}$, $i_{wc}$ dependent upon the amplitudes of $i_u$, $i_v$, $i_w$, are produced. These three-phase current commands $i_{uc}$, $i_{vc}$, $i_{wc}$ are delivered as inverter drive signals $SQ_1$ through $SQ_6$ via NOT gates $NOT_1$ through $NOT_3$ and drivers $DV_1$ through $DV_6$, and are applied as input signals to the inverter 115. The inverter drive signals $SQ_1$ through $SQ_6$ input to the inverter 115 are applied to the bases of the power transistors $Q_1$ through $Q_6$, respectively, thereby controlling the on/off action of the power transistors Q1 through Q6 to supply the synchronous motor 101 with a three-phase current.

Discussed next will be the operation of the arrangement of FIG. 5 in a case where the velocity command is elevated while the synchronous motor 101 is rotating at a certain velocity. The counter 108g is loaded with a position code immediately prior to the start of rotation of the synchronous motor 101, and the counter counts the rotation pulses P1, P2 which are generated as the synchronous motor 101 rotates. Accordingly, the counter 108g indicates the rotational position of the field pole of synchronous motor 101 at all times. Since the rotational pulses P1, P2 will be proportional to the velocity of the synchronous motor 101, the amount of increase in the count in the counter 108g over a prescribed time interval will correspond to the rotational velocity of the synchronous motor 101.

(1) First, to rotate the synchronous motor 101 at a desired rotational velocity $V_c$, the input/output port 108d is supplied with a velocity command VCMD from an external unit such as an NC unit. This command is transmitted to the processor 108a via the bus 108h. Next, the processor 108a reads the value of the count in counter 108g via the bus 108h, computes the difference between this value and that read previously, and divides the difference by the sampling interval T2 to compute the actual velocity Va.

(2) The processor 108a also computes a velocity error ER, which is the difference between the velocity command VCMD and the actual velocity Va, and performs a proportional integration operation expressed by the following equation:

$$I_s = K_1 (V_c - V_a) + K_2 \sum_{i=1}^{k} (V_c - V_a) \\ \sum_{i=1}^{k} (V_c - V_a) = \sum_{i=1}^{k} (V_c - V_a) + (V_c - V_a) \quad (16)$$

Figure 8:
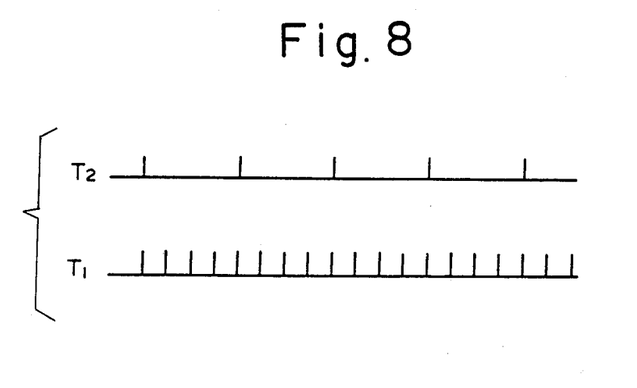
FIGS. 8 and 9 are graphs for describing operation according to the present invention.

The result $I_s$ in Eq. (16) corresponds to the amplitude of the armature current. Specifically, when the load varies or the velocity command changes, the velocity error ER ($=V_c-V_a$) becomes greater, as does the current command amplitude $I_s$ correspondingly. The increased amplitude $I_s$ results in the production of a greater torque, which brings the actual rotational velocity of the motor into conformity with the commanded velocity. The amplitude command $I_s$ is obtained. The foregoing is a velocity loop computation step, which is performed at every sampling period T2, as shown in FIG. 8.

(3) Next, based on the value of the count in counter 108g, the processor 108a retrieves, from a table stored in the data memory 108c, the digital value of sin α indicating the rotational position α of the field pole of synchronous motor 101, as well as the digital value of sin (α+2π/3) indicating the rotational position α+2π/3. Using these values, the processor 108a computes the three phase current commands $I_u, I_v, I_w$ from the following equations:

$$I_u = I_s \sin\alpha \\ I_v = I_s \sin(\alpha + 2\pi/3) \\ I_w = -I_u - I_v \quad (17)$$

(4) Next, the processor 108a reads, via the bus 108h, the actual currents obtained by a digital conversion applied by the AC converter 108f to the actual phase currents $I_{av}, I_{aw}, I_{au}$ obtained from the current transformers 112U, 112V, 112W, respectively, computes the error ER between the three phase current command $I_u, I_v, I_w$ and the actual phase currents $I_{av}, I_{aw}, I_{au}$, and performs the proportional integration operations given by the following equations to obtain the command values $i_u, i_v, I_w$ for application to the DA converter 108e:

$$i_u = K_1' (I_u - I_{au}) + K_2' \sum_{i=1}^{k} (I_u - I_{au}) \\ i_v = K_1' (I_v - I_{av}) + K_2' \sum_{i=1}^{k} (I_v - I_{av}) \\ i_w = K_1' (I_w - I_{aw}) + K_2' \sum_{i=1}^{k} (I_w - I_{aw}) \quad (18)$$

(5) Next, the processor 108a multiplies the actual velocity Va, which was obtained in the foregoing velocity loop computation step, by the coefficient kf, obtains a velocity compensation output VCO, and subtracts this from the command signals $i_u, i_v, i_w$ applied to the D/A converter, thereby obtaining compensated command signals $i_u, i_v, i_w$ for application to the D/A converter. The foregoing is a current loop computation step, which is performed at every sampling period T1 shown in FIG. 8.

The processor 108a sends the compensated command values $i_u, i_v, i_w$ to the DA converter 108e via the bus 108h. These values are thus converted into analog quantities which are delivered to the pulse-width modulating circuit 114. Thereafter, and in similar fashion, the synchronous motor 101 is supplied with three-phase current from the inverter 115.

Figure 9:
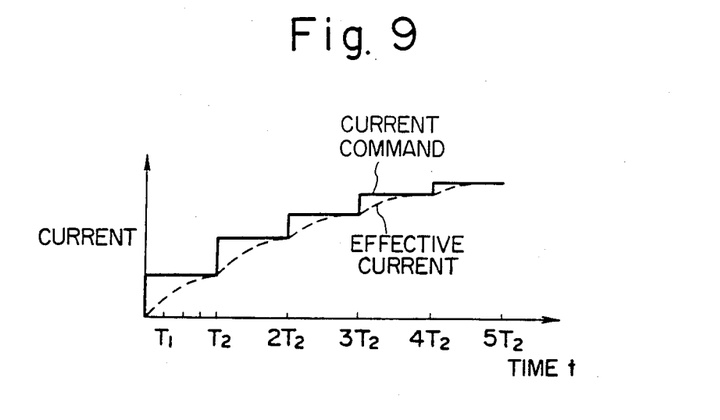

The processor 108a performs the velocity loop computation at every sampling period T2, and performs the current loop computation at every sampling period T1. In the example of FIG. 8, the current loop computation is performed four times for each velocity loop computation. As shown in FIG. 9, the current command base on the velocity loop computation varies in a step-like manner at the period T2. By contrast, since the current loop computation is performed four times, the requirement that the current loop have quick response characteristics can be satisfied if the gain of Eq. (18) is adjusted and the current response is set with respect to the command during T2.

The processor 108a controls the synchronous motor 101 by executing the above-described computations in accordance with the control program in the program memory 108b at the sampling periods T1, T2, so that the synchronous motor 101 will eventually be rotated at the commanded velocity.

In the foregoing, an example was described in which a PI control method of the kind indicated by Eq. (16) is used in the computation for obtaining the current command in step (2) of the velocity loop computation. However, various control methods are known. An IP control method set forth below is one in which complete feedback of the object controlled is taken to stabilize the system, with an integration characteristic being applied with respect to an error between a command and a control quantity. In comparison with PI control, IP control has the advantage of less overshoot and less undershoot when a setting is made.

More specifically, the processor 108a obtains an amplitude command $I_s$ by performing the following computation, based on a velocity error ER between the velocity command VCMD and the actual velocity Va, the actual velocity Va, and the effective value armature current $I_a$:

$$I_s(k) = -K_1 \sum_{i=1}^{k} [V_a(i) - V_c(i)] - K_2 \cdot V_a(k) - K_3 \cdot I_a(k) \quad (19)$$

However, it is not easy to find the effective value armature current Ia. In other words, it is necessary to perform a computation, based on the following equation, using the actual phase currents $I_{au}, I_{av}, I_{aw}$ of the synchronous motor 101:

$$Ia = \sqrt{\left(\frac{I_{au}}{\sqrt{2}}\right)^2 + \left(\frac{I_{av}}{\sqrt{2}}\right)^2 + \left(\frac{I_{aw}}{\sqrt{2}}\right)^2} \quad (20)$$

-continued $$= \frac{1}{2}(I_{au}^2 + I_{av}^2 + I_{aw})$$

In the embodiment of FIG. 5, the velocity and current loop computations are performed by a single computation control unit. However, separate computation control units can be provided for the velocity and current loops, as shown in FIG. 4.

Further, an arrangement may be adopted in which the DA converter 108e in FIG. 5 is constituted by a counter and the processor 108a delivers the digital three-phase AC signal to this counter via the bus 108h, with the counter producing a pulse-width modulated output. In a case where pulse-width modulation is performed, an arrangement may be adopted as disclosed in the specification of Japanese Patent Application Laid-Open No. 53-48449, wherein a digital integrated circuit equipped with a clock generating circuit is used to drive an up/down counter circuit, and a programmable read-only memory responds to the up/down counter by generating a digital output signal which is proportional to a pulse-width modulated drive signal required for the power stage. Thus, a DC voltage may be digitally converted directly into an AC output waveform without using an AC reference waveform. In such case, the pulse-width modulated signal is delivered to a base drive circuit, so that an inverter can be controlled by this signal.

According to the present invention as described above, in a servomotor control system having a sensor for sensing the velocity of a servo motor; a sensor for sensing the actual current flowing into the servomotor; a power drive circuit for the servomotor; and a control unit for obtaining an amplitude command based on an offset velocity (which is the difference between a velocity command and the sensed actual velocity), for performing a velocity loop computation to derive a current command from the obtained amplitude command, and for performing a current loop computation to obtain an offset current (which is the difference between the current command and the sensed actual current), with the offset current of the control unit being applied to the power drive current, the control unit is adapted to execute the velocity loop computation at a period greater than that at which the current loop computation is executed, to obtain a velocity compensation signal by amplifying the sensed actual velocity by a predetermined magnification in the current loop computation, and to compensate the offset current by the velocity compensation signal. Therefore, the load on the control unit performing the computations is lightened, and the current loop computation is executed at a short sampling period. An advantageous result is that a quicker response can be gained for the current loop. In addition, even though the sampling periods of the current loop and velocity loop computations are changed, the current loop computation can be executed without being affected by a fluctuation in velocity and there is no deterioration in the response of the actual current.

While the present invention has been described in accordance with an embodiment thereof, the present invention is not limited to said embodiment but can be modified in various ways in accordance with the gist thereof without departing from the scope of the invention.

According to the present invention, in a system for controlling a motor by using a microprocessor, the burden upon the microprocessor can be reduced. The present invention therefore is well-suited for application to the field of motor control.

We claim:

1. A servomotor control system, connected to receive a velocity command, for controlling a servomotor, comprising:
    a velocity sensor, coupled to the servomotor, for sensing the velocity of the servomotor and for generating an actual velocity signal;
    a current sensor, coupled to the servomotor, for sensing an actual current flowing into the servomotor and for generating an actual current signal;
    a power drive circuit, coupled to the servomotor, for driving the servomotor; and
    a control unit, connected to receive the velocity command and coupled to said velocity sensor, said current sensor, and said power drive circuit, for performing a velocity loop computation to derive a current command for the servomotor based on an offset velocity which is the difference between the velocity command for the servomotor and the actual velocity signal, said control unit performing a current loop computation to obtain a command for controlling said power drive circuit said control unit obtaining a velocity compensation signal in the current loop computation by amplifying the actual velocity signal by a predetermined magnification, so that the command for controlling said power drive circuit is compensated by the velocity compensation signal, the velocity loop computation being executed at a period which is longer than the period at which the current loop computation is executed.

2. The servomotor control system according to claim 1, wherein the velocity loop computation and the current loop computation are performed by a single processor.

3. A servomotor control system according to claim 1, wherein said control unit comprises:
    a first computation control unit for performing the velocity loop computation; and
    a second computation control unit for performing the current loop computation.

4. A servomotor control system, connected to receive a velocity command, for controlling a servomotor, comprising:
    a velocity sensor, coupled to the servomotor, for sensing the velocity of the servomotor and for generating an actual velocity signal;
    means, coupled to the servomotor, for generating an actual current signal based on the current flowing into the servomotor;
    a power drive circuit, coupled to the servomotor, for driving the servomotor based on a compensated drive signal; and
    a control unit, connected to receive the velocity command and coupled to said velocity sensor, said generating means and said power drive circuit, for performing a velocity loop computation to derive a current command based on an offset velocity which is the difference between the velocity command and the actual velocity signal, and for performing a current loop computation to obtain a drive command based on an offset current which is the difference between the current command and the actual current signal, said control unit including means for obtaining a velocity compensation signal by amplifying the actual velocity signal by a predetermined magnification and for combining the velocity compensation signal and the drive command to obtain the compensated drive signal which is provided to said power drive circuit, so that interference between current and velocity due to a reverse electromotive force in the servomotor is reduced, the velocity loop computation being executed at a period which is longer than the period at which the current loop computation is executed.

5. A servomotor control system according to claim 4, wherein said control unit is formed by a single processor.

6. A servomotor control system according to claim 4, wherein said control unit comprises:
- a first computation control unit for performing the velocity loop computation;
- a second computation control unit for performing the current loop computation; and
- means for obtaining the velocity computation signal and the compensated drive signal.

* * * * *

UNITED STATES PATENT AND TRADEMARK OFFICE
CERTIFICATE OF CORRECTION

PATENT NO. : 4,573,002
DATED : FEBRUARY 25, 1986
INVENTOR(S) : MITSUO KURAKAKE ET AL.

It is certified that error appears in the above-identified patent and that said Letters Patent is hereby corrected as shown below:

Col. 3, after line 29, in the equation, insert $$--=\frac{3}{2}KI \quad \ldots \quad (9)--;$$

line 37, "$\theta_o$" should be --$\phi_o$--.

Col. 6, line 1, "modulating" should be --modulation--;
line 7, "2," should be --122,--;
line 9, "112" should be --122--.

Col. 9, line 2, "$(\dot{I}^2_{au} + \dot{I}^2_{av}$" should be --$(\dot{I}_{au}^2 + \dot{I}_{av}^2$--.

Col. 10, line 36, "The" should be --A--.

Signed and Sealed this

Third Day of June 1986

[SEAL]

Attest:

DONALD J. QUIGG

Attesting Officer

Commissioner of Patents and Trademarks